United States Patent [19]

Takanashi et al.

[11] Patent Number: 5,039,209

[45] Date of Patent: Aug. 13, 1991

[54] LIGHT-TO-LIGHT CONVERSION METHOD AND DISPLAY UNIT USING THE SAME

[75] Inventors: Itsuo Takanashi, Kamakura; Tsutou Asakura, Yokohama; Shintaro Nakagaki, Fujisawa; Hirohiko Shinonaga, Yokohama; Masato Furuya; Tetsuji Suzuki, both of Yokosuka, all of Japan

[73] Assignee: Victor Company of Japan, Ltd., Yokohama, Japan

[21] Appl. No.: 523,429

[22] Filed: May 15, 1990

[30] Foreign Application Priority Data

May 16, 1989 [JP] Japan .................................. 1-122299

[51] Int. Cl.[5] .................... G02B 26/00; G02F 1/03; G02F 1/13; H04N 5/74
[52] U.S. Cl. .................................... 359/72; 358/233; 359/93; 359/245; 359/36
[58] Field of Search ............... 350/381, 385, 389, 401, 350/355, 356, 360, 361, 335, 342, 347 R, 347 E, 350 F; 358/62, 233

[56] References Cited

U.S. PATENT DOCUMENTS

| | | | |
|---|---|---|---|
| 3,524,064 | 8/1970 | Keyes | 350/355 |
| 3,527,522 | 9/1970 | Baumgartner | 350/361 |
| 3,732,429 | 5/1973 | Braunstein et al. | 350/342 |
| 3,740,734 | 6/1973 | Maldonado | 350/356 |
| 4,423,927 | 1/1984 | Bly | 350/342 |
| 4,533,215 | 8/1985 | Trias et al. . | |
| 4,679,910 | 7/1987 | Efron et al. | 350/342 |
| 4,807,976 | 2/1989 | Little et al. . | |
| 4,881,110 | 11/1989 | Braatz et al. | 350/342 |

FOREIGN PATENT DOCUMENTS

| | | | |
|---|---|---|---|
| 0324434 | 7/1989 | European Pat. Off. | 350/356 |
| 0128521 | 7/1984 | Japan | 350/355 |
| 0138233 | 6/1986 | Japan | 350/350 F |
| 0056419 | 3/1989 | Japan | 350/342 |
| 1211719 | 8/1989 | Japan . | |
| 1286685 | 11/1989 | Japan . | |

OTHER PUBLICATIONS

A. Kiessling et al.; "An Incoherent-to-Coherent Optical Image Converter and its Application in Hybrid Optical Processors"; Fim/Fgan Research Institute, Germany; Jun. 1979.

Bleha et al.; "Optical-to-Optical Image Conversion with the Liquid Crystal Light Valve"; SPIE vol. 317 (1981) p. 179.

*Primary Examiner*—Eugene R. LaRoche
*Assistant Examiner*—Evelyn A. Lester
*Attorney, Agent, or Firm*—Pollock, Vande Sande & Priddy

[57] ABSTRACT

Time sequential information is written to a first light-to-light conversion element, and the thus-written time sequential information is thereafter written from the first light-to-light conversion element to a second light-to-light conversion element in the form of two-dimensional information. With this arrangement, the time sequential information can be converted with high resolution to the two-dimensional information in real time operation without involving a brightness gradient or shading.

15 Claims, 5 Drawing Sheets

R: READING
E: ERASING
W: WRITING

LIGHT-TO-LIGHT CONVERSION METHOD AND DISPLAY UNIT USING THE SAME

BACKGROUND OF THE INVENTION

The present invention relates to a light-to-light conversion method for storing information contained in electromagnetic radiation signals such as light signals in the form of a corresponding pattern of electric charges and for reading out, with high resolution, in the form of electromagnetic signals, and also relates to a high resolution display unit for reducing the method in practice. More particularly, the present invention relates to the improvements in and relating to a signal conversion system for converting time sequential signals to two-dimensional signals.

There are known various display units, such as cathode ray tubes, liquid crystal panels, plasma display panels, projection cathode ray tubes, liquid crystal projectors, etc. As a high resolution display system, there has been proposed a modified display unit wherein picture information is written to a spatial light modulation means which in turn modifies the incident light to display an image.

Such conventional high resolution display unit is shown in FIG. 6 of the accompanying drawings. The display unit 10 includes a dielectric mirror 12 laminated between a photoconductive layer 14 and a photo-modulation layer 16. The outside surfaces of the respective layers 14, 16 are laminated with a pair of transparent electrodes 18, 20 across which a voltage is applied by a power supply 22 when the recorded signals are to be read. A screen 24 is disposed on the display side of the display unit 10.

The dielectric mirror 12 of the display unit 10 is provided for reflecting the incident light. Writing light containing information is projected in a time sequential manner onto the photoconductive layer 14 in a direction indicated by the arrow F1. The writing light is scanned in a direction indicated by the arrow F2, as in the television, whereby the entire incident surface of the display unit 10 receives the writing light. In this instance, pairs of electrons and holes are produced in the photoconductive layer 14 depending on the intensity of the incident light, which electron and hole pairs are then separated by a voltage applied by the power supply 22. The photo-modulation layer 16 produces an electro-optic effect under the influence of an electric field produced by the photoconductive layer 14. The electro-optic effect thus produced is exerted on the incident light.

The conventional display unit 10 of the foregoing construction operates as follows. Writing light which contains the necessary information in a time sequential manner is directed onto the display unit 10 from left to right of FIG. 6, as indicated by the arrow F1. Then, the writing light is scanned in the direction as indicated by the arrow F2. With this scanning, pairs of electrons and holes pairs are produced and then separated in the photoconductive layer 14 of the display unit 10, in the manner as described above. As a consequence, a pattern or image of electric charges is formed on the surface of the photoconductive layer 14 facing the photo-modulation layer 16.

The electron and hole pairs are produced depending on the intensity of the incident light, namely the contents of information contained in the writing light. Accordingly, the electric charge pattern thus produced corresponds to two-dimensional information which has been obtained by arranging the time sequential information arranged in the scanning direction of the writing light. The writing light moving in the photoconductive layer 14 is reflected by the dielectric mirror 12.

To read the time sequential information thus written, reading light is projected onto the whole surface of the photo-modulation layer 16 from the direction indicated by the arrow F3 shown in FIG. 6. The electric charge pattern formed in the photoconductive layer 14 produces a corresponding electric field in the photo-modulation layer 16. Under the influence of the electric field formed by the electric charge pattern or image, the photo-modulation layer 16 exerts an electro-optic effect on the incident light.

The reading light moving in the photo-modulation layer 16 in the manner described above is modified under the electro-optic effect. The reading light thus modulated is reflected by the dielectric mirror 12 and outputted in a direction indicated by the arrow F4.

The depth or degree of modulation at a particular point corresponds to the strength of the electro-optic effect at that point of the photo-modulation layer 16. Since the electro-optic effect corresponds to the electric charge pattern or image formed in the photoconductive layer 14, and since the electric charge pattern corresponds to the contents of information contained in the writing light, the modulated light reflected in the direction of the arrow F4 necessarily contains the time sequential information in the form of two-dimensional information.

The modified light is projected on the screen 24 where the time sequential information is reproduced as the two-dimensional information. To erase the information stored in the display unit 10, erasing light is projected onto the photoconductive layer 14 in a direction indicated by the arrow F5.

In the foregoing display unit 10, pieces of information are written in sequence as the writing light is scanned. On the other hand, read-out of the information is achieved two-dimensionally, i.e., all pieces of information are read out simultaneously from the entire surface of the display unit 10.

As a consequence, the display time or duration differs between an upper part and a lower part of the screen with the result that a brightness gradient or shading is produced in the reproduced image. In other words, the quantity of light gradually increases toward the upper part of the reproduced image and decreases toward the lower part of the reproduced image.

One solution for the foregoing problem is proposed in the specification of Japanese patent application No. 63-36775. According to this solution, a stripe electrode is provided for each scanning line of the writing light. When one scanning line is being scanned with the writing light, erasing light is irradiated to the preceding scanning line for erasing information recorded thereon.

In other words, the writing light is scanned to write information while at the same time the erasing light follows the writing light with a delay equal to the scanning duration for one scanning line so as to erase the recorded information. With this arrangement, the display time is substantially uniform throughout the entire region of the reproduced image.

The foregoing proposed solution however needs an additional deflection scanning system for scanning the erasing light. Furthermore, the stripe electrodes each provided for one scanning line require a precision processing which is time consuming and incurs an additional cost. Another drawback is that the resolution of the display unit is limited by the number of stripe electrodes.

SUMMARY OF THE INVENTION

With the foregoing drawbacks of the prior art in view, it is an object of the present invention to provide an improved light-to-light conversion method which is capable of converting the time sequential information with high resolution to the two-dimensional information without the necessity of a costly and time-consuming process.

Another object of the present invention is to provides a high resolution display unit for reducing the light-to-light conversion method into practice.

In brief, according to the present invention, time sequential information is written in a first light-to-light conversion element. The written or recorded information is read out from the first light-to-light conversion element in the form of two-dimensional information which in turn is written to a second light-to-light conversion element. Thereafter, the information written to the second light-to-light conversion element is displayed.

More particularly, according to a first aspect of the present invention, there is provided a light-to-light conversion method for converting time sequential information into two-dimensional information, which comprises: providing first and second light-to-light conversion elements disposed in confronting relation to one another; writing time sequential information to the first light-to-light conversion element by using first electromagnetic radiation; and irradiating the first light-to-light conversion element with second electromagnetic radiation to read the information from the first light-to-light conversion element and then write the thus-read information to the second light-to-light conversion element.

According to a second aspect of the present invention, there is provided a light-to-light conversion method for converting time sequential information into two-dimensional information, which comprises: providing a light-to-light conversion element composed of at least a light storage layer, a photoconductive layer and a photomodulation layer disposed in confrontation in the order named; writing time sequential information to the light storage layer by using first electromagnetic radiation; and writing the information to the photoconductive layer by using second electromagnetic radiation transmitted from the light storage layer.

According to a third aspect of the present invention, there is provided a display unit comprising: first and second light-to-light conversion elements disposed in confronting relation to one another; means for writing time sequential information to the first light-to-light conversion element by using first electromagnetic radiation; means for irradiating the first light-to-light conversion element with second electromagnetic radiation to read the information from the first light-to-light conversion element and then write the thus-read information to the second light-to-light conversion element; and means for displaying the information written by the irradiating means to the second light-to-light conversion element.

According to a fourth aspect of the present invention, there is provided a display unit comprising: a light-to-light conversion element composed of at least a light storage layer, a photoconductive layer and a photomodulation layer disposed in confrontation in the order named; means for writing time sequential information to the light storage layer by using first electromagnetic radiation and then writing the information from the light storage layer to the photoconductive layer by using second electromagnetic radiation transmitted from the light storage layer; and means for displaying the information written by the writing means to the photoconductive layer.

According to a fifth aspect of the present invention, there is provided a display unit comprising: a two-dimensional conversion element for converting time sequential information to two-dimensional information: a light-to-light conversion element disposed in confronting relation to the two-dimensional conversion element; means for writing time sequential information to the two-dimensional conversion element by using first electromagnetic radiation; means for irradiating the two-dimensional conversion element with second electromagnetic radiation to read the two-dimensional information from the two-dimensional conversion element and then write the thus-read information to the light-to-light conversion element; and means for displaying the information written by the irradiating means to the light-to-light conversion element.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 5A:
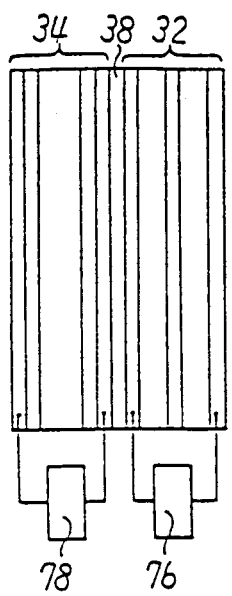
FIG. 5(A) through 5(C) are diagrammatical views showing different embodiments of the present invention.
Figure 5C:
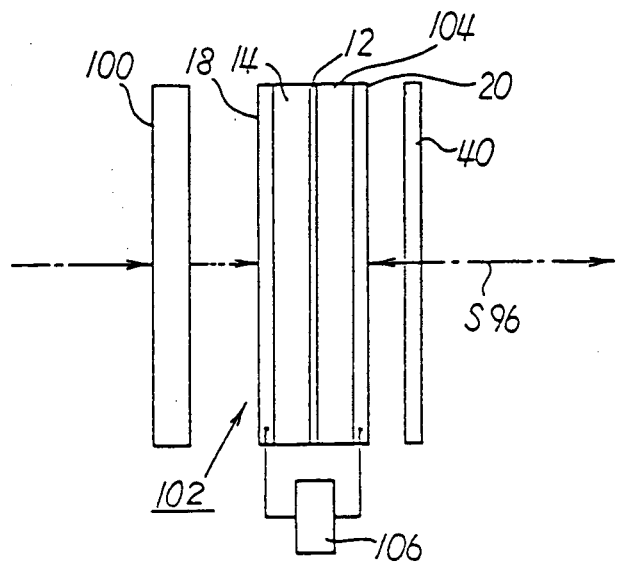
Figure 5B:
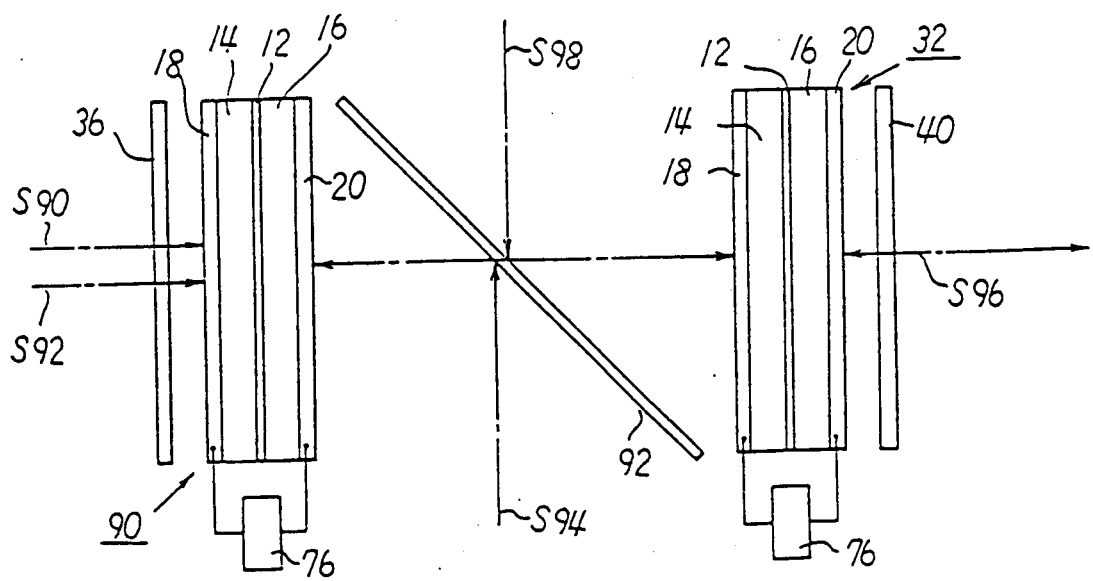
Figure 6:
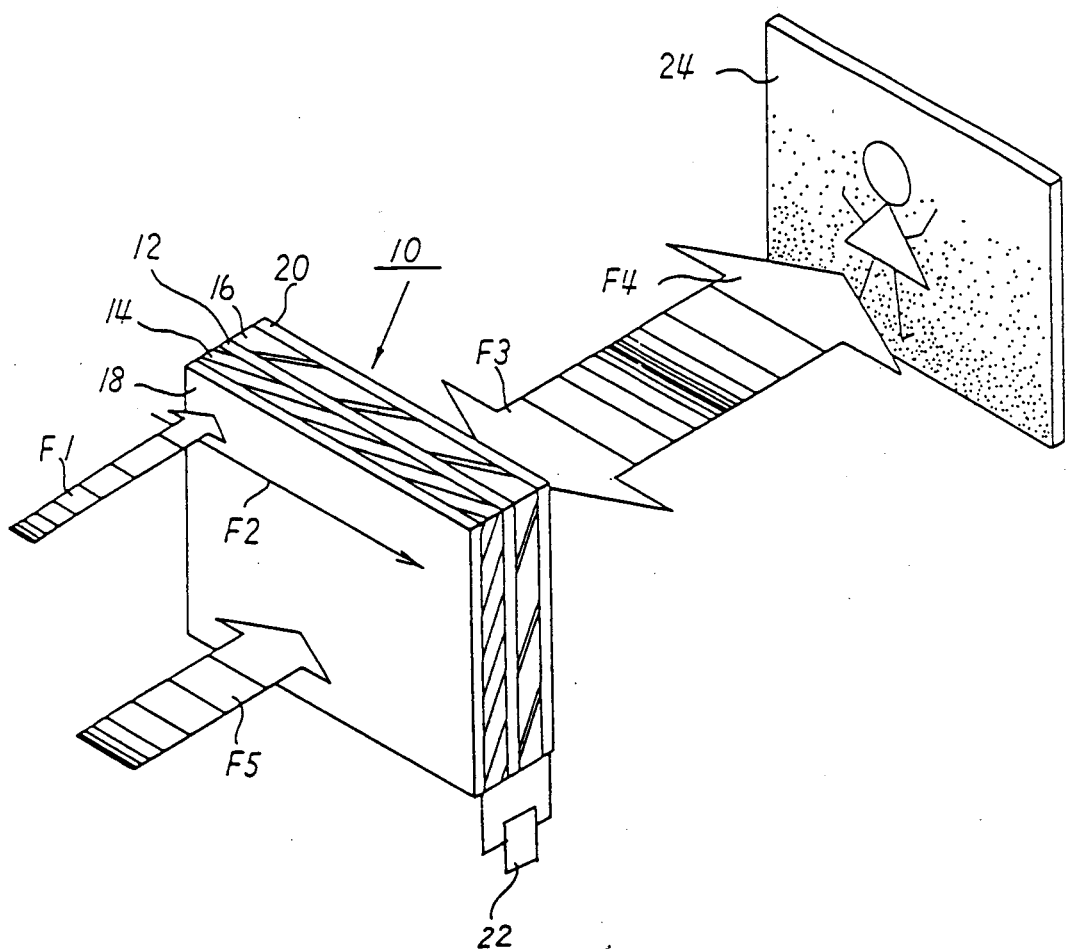
FIG. 6 is a perspective view showing a conventional display unit.

Certain preferred embodiments of the present invention will be described below in greater detail with reference to FIGS. 1 through 5(C) of the accompanying drawings, wherein these parts which correspond to those of the conventional device shown in FIG. 6 are designated by identical reference characters.

Figure 4A:
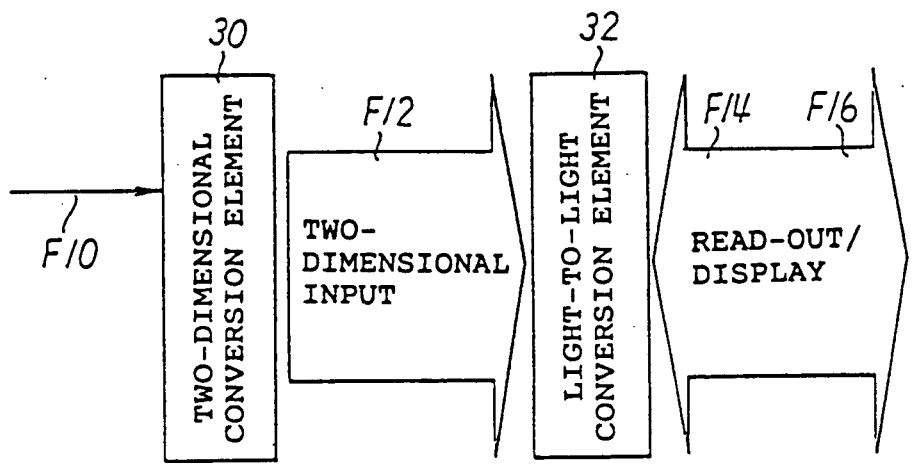
FIGS. 4(A) through 4(C) are explanatory views showing the general construction of different systems according to further aspects of the present invention.
Figure 4B:
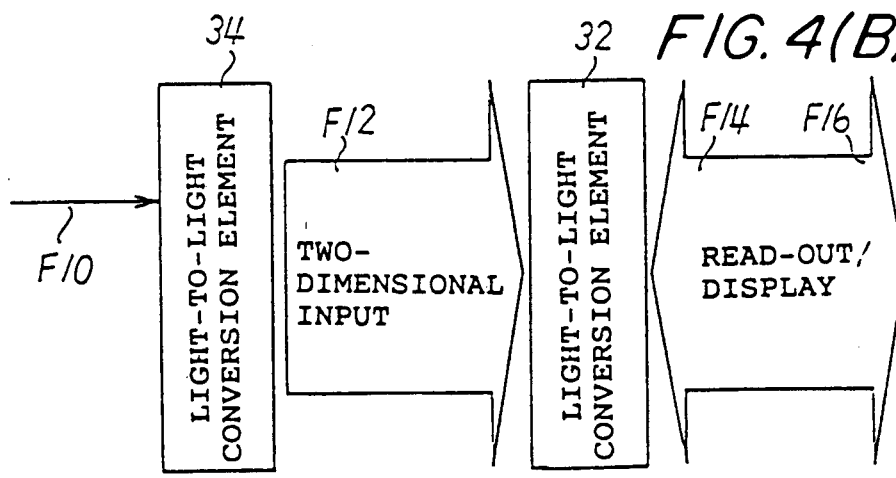

FIG. 4(A) shows the general concept of the present invention. The present invention is generally directed to a display unit including a two-dimensional conversion element 30 and a light-to-light conversion element 32. Electromagnetic radiation signals containing time sequential information are scanned over the two-dimensional conversion element 30 in a direction indicated by the arrow F10. The two-dimensional conversion element 30 converts the time sequential information recorded therein to two-dimensional information and output the latter to the whole surface of the light-to-light conversion element 32 in a direction indicated by the arrow F12.

In the light-to-light conversion element 32, the inputted two-dimensional information is subjected to the light-to-light conversion and read out two-dimensionally as indicated by the arrow F16 when incident reading light is irradiated onto the light-to-light conversion element 32 in a direction indicated by the arrow F14. The reading light is projected on a screen (not shown) where a corresponding display image appears.

Then, a description is given to a first embodiment of the present invention shown in FIGS. 1-3 and 4(B). In the first embodiment, a light-to-light conversion element 34 constitutes the two-dimensional conversion element 30 shown in FIG. 4(A).

Figure 1:
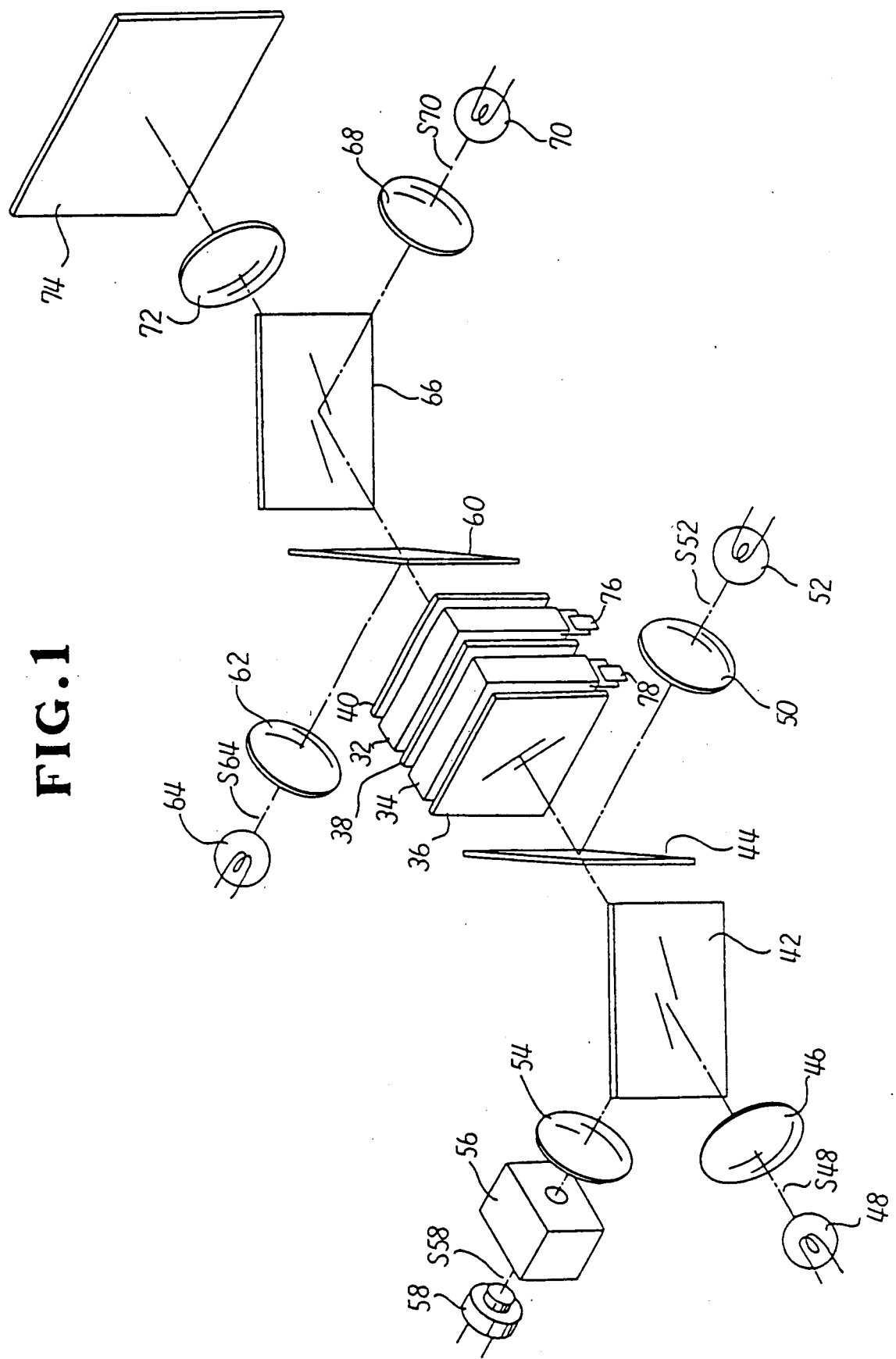
FIG. 1 is an exploded perspective view of the general construction of a display unit according to a first embodiment of the present invention.

As shown in FIG. 1, a display unit according to the first embodiment includes two confronting light-to-light conversion elements 32, 34 and three polarizers 36, 38, 40 disposed one on each side of the conversion elements 32, 34, with the polarizer 38 interposed between the conversion plates 32, 34. To the first light-to-light conversion element 34, reading/writing light S48 is inputted from a first light source 48 successively through a lens 46, a first beam splitter 42 and a second beam splitter 44. The first light-to-light conversion element 34 is further adapted to be irradiated with erasing light S52 directed from a second light source 52 successively through a lens 50 and the second beam splitter 44. Furthermore, writing light S58 generated by third light source composed of a laser apparatus 58 is inputted to the first light-to-light conversion element 34 successively through a scanning deflector 56, a lens 54, the first beam splitter 42, and the second beam splitter 44.

The reading/writing light S48 and the erasing light S52 are irradiated two-dimensionally over the entire incident surface of the first light-to-light conversion element 34, while the reading light S58 is irradiated in a scanning manner to the first light-to-light conversion element 34.

The second light-to-light conversion element 32 is adapted to be irradiated with erasing light S64 inputted from a fourth light source 64 successively through a lens 62 and a third beam splitter 60. Furthermore, reading light S70 generated by a fifth light source 70 is inputted through a lens 68 and a fourth beam splitter 66 to the second light-to-light conversion element 32. The reading light outputted from the second light-to-light conversion element 32 passes successively through the third beam splitter 60, the fourth beam splitter 66 and the lens 72 and then is projected onto a screen 74. The erasing light S64 and the reading light S70 are irradiated two-dimensionally over the output side surface of the second light-to-light conversion element 32.

The polarizers 36, 38, 40 are provided to appropriately select the light having a certain plane of polarization. The reading/writing light S48 is applied when the information is to be read from the first light-to-light conversion element 34 and then written to the second light-to-light conversion element 32. The light-to-light conversion elements 32, 34 are connected to power supplies 76, 78, respectively, for controlling the writing and erasing of the information.

Figure 2:
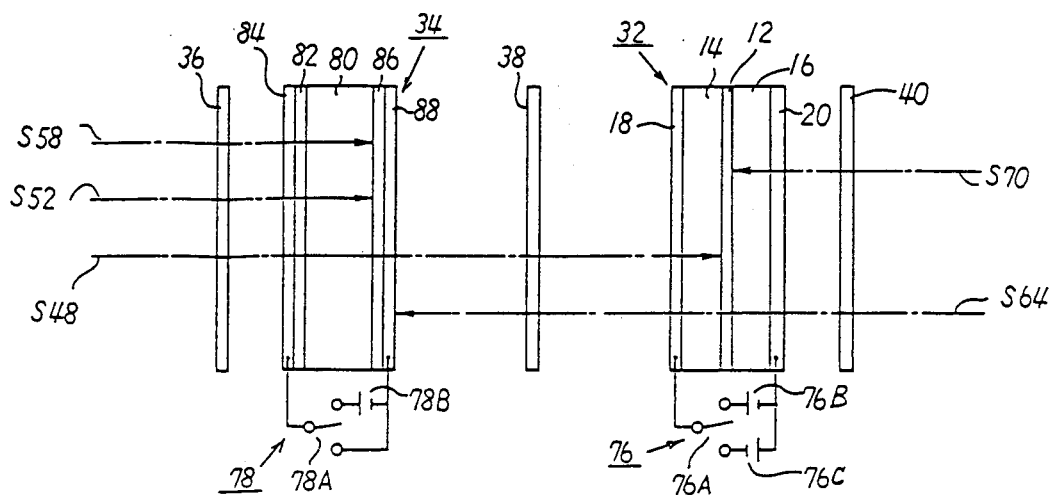
FIG. 2 is a diagrammatical view of a main portion of the display unit shown in FIG. 1.

Referring now to FIG. 2, there is shown a main portion of the display unit of the first embodiment shown in FIG. 1. The second light-to-light conversion element 32 shown in this figure is structurally the same as the display unit 10 shown in FIG. 6. Namely, the second light-to-light conversion element 32 includes a photoconductive layer 14 and a photo-modulation layer 16 laminated together, with a dielectric mirror 12 interposed between these layers 14, 16. Opposite outer surfaces of the second light-to-light conversion element 32 are laminated with two transparent electrodes 18, 19 between which the power supply 76 is connected.

The power supply 76 includes a switch 76A and first and second batteries 76B, 78C of opposite polarities. The switch 76A selectively connects the first and second batteries 76B and 76C with the transparent electrodes 18, 20 to apply a voltage thereacross. To read and write information, the switch 76A is shifted toward the first battery 76B, while in the erasing mode, the switch 76A is shifted toward the second battery 76C.

The dielectric mirror 12 of the second light-to-light conversion element 32 is constructed to reflect light of a wavelength band in which the wavelength of the reading/writing light S48 and the wavelength of the reading light S70 are contained, and to transmit light of a wavelength band in which the wavelength of the erasing light S64 is contained. The photo-modulation layer 16 used in combination with the reflector plate is made, for example, of lithium niobate which shows the birefringence or double refraction phenomenon as an electro-optic effect.

The first light-to-light conversion element 34 has in its mid portion a bismuth silicon oxide layer 80 formed of a crystalline bismuth silicon oxide which has a photoconductive effect and an electro-optic effect. On one side of the bismuth silicon oxide layer 80 which faces to the polarizer 36, an insulating layer 82 and a transparent electrode 84 are laminated in the order named. On the opposite side of the bismuth silicon oxide layer 80 facing to the polarizer 38, a dielectric mirror 86 and a transparent electrode 88 are laminated in the order named. The transparent electrodes 84, 88 are connected with the power supply 78.

The power supply 78 includes a switch 78A and a battery 78B. The switch 78A is shifted toward the battery 78B to enable the latter to apply a voltage across the electrodes 84, 88 when information is to be written to and read from the first light-to-light conversion element 34.

The writing, reading and erasing of the information are all performed in the bismuth silicon oxide layer 80 of the first light-to-light conversion element 34. The dielectric mirror 86 is so constructed as to reflect light of a wavelength band in which the wavelength of the erasing light S52 and the wavelength of the writing light S58 are contained, and to transmit light of a wavelength band in which the wavelength of the reading/writing light S48 is contained.

Figure 3:
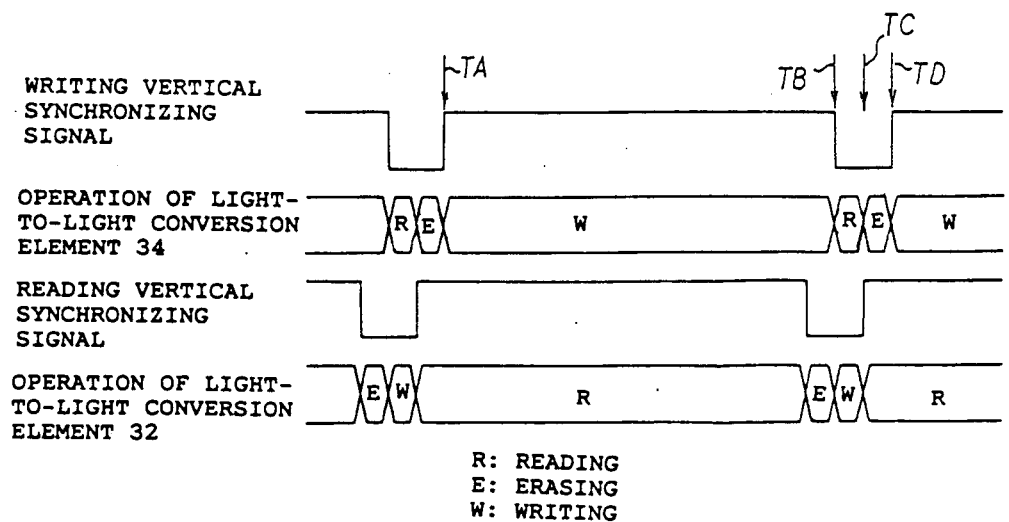
FIG. 3 is a time chart illustrative of the operation of the display unit.

The operation of the display unit of the foregoing embodiment will be described below with reference to the time chart shown in FIG. 3. In FIG. 3, a series of operations necessary for the formation of dynamic display images from the time sequential signals are shown.

To the first light-to-light conversion element 34 from which information has been erased, time sequential information is written by writing light S58 from the start TA of the duration of a vertical synchronizing signal. The writing light S58 scanned over the first light-to-light conversion element 34 moves in the bismuth silicon oxide layer 80 whereupon pairs of electrons and holes are produced by the photoconductive effect. The electron and hole pairs are separated by an electric field produced by the battery 78B of the power supply 78, whereby a pattern of electric charges corresponding to the time sequential information contained in the writing light S58 is formed in the bismuth silicon oxide layer 80. This operation continues throughout the recording time of one scene of the time sequential information, i.e., until the end TB of the vertical synchronizing signal duration. On the other hand, in the second light-to-light conversion element 32, the previously written or recorded information is erased by the erasing light S64 before the end TB of the vertical synchronizing signal duration.

When the information for one scene is written, the bismuth silicon oxide layer 80 produces a corresponding electro-optic effect under the influence of the electric field produced by the charge pattern or image. Thus, when the reading/writing light S48 is irradiated over the entire surface of the first light-to-light conversion element 34 at the time TB, the aforesaid electro-optic effect produced in the bismuth silicon oxide layer 80 is in turn produced in every point of the entire surface of the light-to-light conversion element 34 in corresponding relation to the charge image. The information written to the bismuth silicon oxide layer 80 is thus read out.

The reading/writing light S48 modulated by the bismuth silicon oxide layer 80 moves onto the entire surface of the photoconductive layer 14 of the second light-to-light conversion element 32 without being reflected by the dielectric mirror 86. In the photoconductive layer 14, information contained in the incident light is written by the photoconductive effect. Consequently, the information read out by the reading/writing light S48 from the first light-to-light conversion element 34 is written to the second light-to-light conversion element 32 in the form of two-dimensional information. This reading/writing operation comes to an end at the time TC.

Then, the erasing light S52 is irradiated two-dimensionally over the entire surface of the first light-to-light conversion element 34 to erase the information recorded therein before the next succeeding vertical synchronizing signal duration starts at the time TD for recording or writing new information. After TD, the writing light S58 is scanned to record or write the information again as in the manner described above.

On the other hand, when the writing of information to the second light-to-light conversion element 32 is completed at TC, the duration of a display vertical synchronizing signal begins to commence the display of the recorded or written information. More specifically, the reading light S70 is irradiated two-dimensionally over the entire surface of the photo-modulation layer 16. In this instance, the photo-modulation layer 16 is in the condition that an electro-optic effect can be produced under the influence of the electric field produced by the charge image formed in the photoconductive layer 14. Thus, the incident reading light S70 is modulated to such a degree corresponding to the information written from the first light-to-light conversion element 34 and then is reflected by the dielectric mirror 12 toward the screen 74. This reading step continues throughout the display vertical synchronizing signal duration.

The foregoing cycle of operations is repeated, whereby images are projected on the screen 74 successively one at a time when each of the succeeding display vertical synchronizing signal durations starts.

According to the first embodiment described above, the writing light S58 is scanned over the first light-to-light conversion element 34 to record or write information. The information thus written is read out from the first light-to-light conversion element 34 by the reading/writing light S48 irradiated two-dimensionally over the first light-to-light conversion element 34 and then written to the second light-to-light conversion element 32. The reading/writing operation is achieved two-dimensionally over the entire surface of the first and second light-to-light conversion elements 34, 32. The reading out of the information from the first light-to-light conversion element 32 is achieved by the reading light S70 irradiated two-dimensionally over the entire surface of the second light-to-light conversion element 32.

The time sequential information is converted by the first light-to-light conversion element 34 to two-dimensional information which in turn is written to the second light-to-light conversion element 32. The two-dimensional information thus written is read out two-dimensionally from the entire surface of the second light-to-light conversion element 32. With this display method, the brightness gradient or shading caused by the difference in display time can be reduced considerably and hence the excellent display images are obtained.

The reading time or duration for reading information from the first light-to-light conversion element 34 is relatively short, however, the brightness of an optical image written in the second light-to-light conversion element 32 can readily be enhanced by properly increasing the intensity of reading light. Furthermore, since the writing time or duration for writing information to the second light-to-light conversion element 32 is short, a relatively long display time is available. Thus, a bright display image can be obtained.

The foregoing display method obviates the necessity of electrodes provided for individual scanning lines and hence an expense and time-consuming precision processing is no longer necessary.

The invention will be further described with reference to a second embodiment shown in FIG. 5(A). This embodiment differs from the first embodiment described above in that the first and second light-to-light conversion elements 34, 32 are laminated together with the polarizer 38 disposed therebetween. With this unitary laminated construction, the reading/writing light S48 can be smoothly transmitted from the first light-to-light conversion element 34 to the second light-to-light conversion element 32 without causing deterioration of the intensity of light due to diffraction.

FIG. 5(B) shows a third embodiment of the present invention. In this embodiment, a first light-to-light conversion element 90 provided for converting time sequential information to two-dimensional information has the same constructed as the second light-to-light conversion element 32 of the first embodiment shown in FIG. 2. The light-to-light conversion element 90 includes a photoconductive layer 14 and a photo-modulation layer 16 laminated together with a dielectric mirror 12 disposed therebetween, and a pair of transparent electrodes 18, 20 laminated on the opposite outer surfaces of the layers 14, 16. A power supply 76 is connected between the transparent electrodes 18, 20.

The first light-to-light conversion element 90 is disposed in confrontation to a second light-to-light conversion element 32 with a beam splitter 92 positioned therebetween. The dielectric mirror 12 of the first light-tolight conversion element 90 is so constructed as to reflect all of the writing light S90, the erasing light S92 and the reading/writing light S94. The second light-to-light conversion element 32 has a dielectric mirror 12 which is so constructed as to reflect the reading light S96 and the reading/writing light S94 and to transmit the erasing light S98.

The display unit of the foregoing construction operates as follows. The writing light 90 is scanned to write information to the photoconductive layer 14 of the first light-to-light conversion element 90. To read two-dimensional information from the first light-to-light conversion element 90, the reading/writing light S94 is reflected by the beam splitter 92 and irradiated to the entire surface of the photo-modulation layer 16.

The reading/writing light S94 is then reflected by the dielectric mirror 12 of the first light-to-light conversion element 90 and moves again into the beam splitter 94. The reading/writing light S94 transmitted through the beam splitter 94 writes information two-dimensionally throughout the surface of the photoconductive layer 14 of the second light-to-light conversion element 32. Then, the information is read out from the second light-to-light conversion element 32 by the reading light S96 in the same manner as done in the first embodiment described above.

The information written to the first light-to-light conversion element 90 is erased by the erasing light S92 in the same manner as done in the first embodiment described above. On the other hand, to erase information from the second light-to-light conversion element 32, the erasing light S98 is reflected by the beam splitter 94 toward the photoconductive layer 14 of the second light-to-light conversion element 32.

Figure 4C:
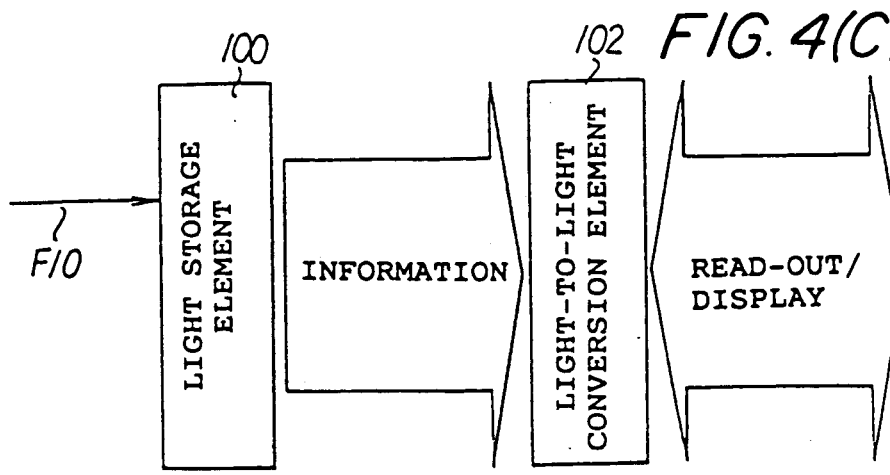

A further description will be given to a fourth embodiment of the present invention shown in FIGS. 4(C) and 5(C). According to this embodiment, a light storage element 100 is used in place of the two-dimensional conversion element 30 shown in FIG. 4(A), in combination of a light-to-light conversion element 102. The light storage element 100 may comprise a fluorescant substance which produces a fluorescent light while it is being acted upon by electromagnetic radiation beams.

The light-to-light conversion element 102 is structurally the same as the light-to-light conversion element 32 of the first embodiment except a power supply 106. A photo-modulation layer 104 of the light-to-light conversion element 102 is composed of a twisted-nematic liquid crystal capable of producing a hybrid electric field effect. The power supply used for driving the twisted-nematic liquid crystal is an AC power supply.

The operation of the fourth embodiment will be described below. Writing light containing time sequential information is scanned over the light storage element 100 in the same manner as done in the preceding embodiments whereupon the light storage element 100 generates, for a predetermined period time, a fluorescent light corresponding to the intensity of incident light, i.e. the contents of time sequential information.

While keeping this condition, the reading light is irradiated onto the entire surface of the photo-modulation layer 104 which in turn modulates the reading light to such an extent corresponding to the written information. Thus, a display image corresponding to the read-out information appears on a screen, not shown, in the same manner as done in the preceding embodiments. The light-to-light conversion element 102 has no function to store the written information so that erasing of the information from this conversion element 102 is no longer necessary.

According to the fourth embodiment described above, the display time is determined by a luminous time of the fluorescent substance. Consequently, if the fluorescent luminous time is extended to approximate a unit frame length of the picture, a long display time can be available, which will insure a bright flicker-free displaying.

As described above, according to the present invention, time sequential information is written to a first light-to-light conversion element, and the thus-written time sequential information is thereafter written from the first light-to-light conversion element to a second light-to-light conversion element in the form of two-dimensional information. With this arrangement, the time sequential information can be converted with high resolution to the two-dimensional information in real time operation without involving a brightness gradient or shading.

Obviously various minor changes and modifications of the present invention are possible in the light of the above teaching. For instance, the light-to-light conversion element 32 can be used as a display panel in which instance a direct vision display unit is provided. Furthermore, a liquid crystal having a light scattering effect may be used in which instance the polarizer 38 can be omitted. Likewise, appropriate modifications may be made to the construction of the optical systems used to project the electromagnetic radiation beams to the two-dimensional conversion element or the light-to-light conversion elements. Furthermore, the principles of the present invention can be applied to the field of optical computers. It is therefore to be understood that within the scope of the appended climes the invention may be practiced otherwise than as specifically described.

What is claimed is:

1. A light-to-light conversion method for converting time sequential information into two-dimensional information, which comprises:

providing first and second light-to-light conversion elements disposed in confronting relation to one another;

writing time sequential information to the first light-to-light conversion element by using first electromagnetic radiation; and irradiating said first light-to-light conversion element with second electromagnetic radiation to read the information from said first light-to-light conversion element and then write the thus-read information to said second light-to-light conversion element.

2. A light-to-light conversion method for converting time sequential information into two-dimensional information, which comprises:

providing a light-to-light conversion element composed of at least a light storage layer, a photoconductive layer and a photo-modulation layer disposed in confrontation in the order named;

writing time sequential information to said light storage layer by using first electromagnetic radiation; and writing the information to said photoconductive layer by using second electromagnetic radiation transmitted from said light storage layer.

3. A display unit comprising:

first and second light-to-light conversion elements disposed in confronting relation to one another;

means for writing time sequential information to said first light-to-light conversion element by using first electromagnetic radiation;

means for irradiating said first light-to-light conversion element with second electromagnetic radiation to read the information from said first light-to-light conversion element and then write the thus-read information to said second light-to-light conversion element; and means for displaying the information written by said irradiating means to said second light-to-light conversion element.

4. A display unit comprising:

a light-to-light conversion element composed of at least a light storage layer, a photoconductive layer and a photo-modulation layer disposed in confrontation in the order named;

means for writing time sequential information to said light storage layer by using first electromagnetic radiation and then writing the information from said light storage layer to the photoconductive layer by using second electromagnetic radiation transmitted from said light storage layer; and means for displaying the information written by said writing means to said photoconductive layer.

5. A display unit comprising:

a two-dimensional conversion element for converting time sequential information to two-dimensional information;

a light-to-light conversion element disposed in confronting relation to said two-dimensional conversion element;

means for writing time sequential information to said two-dimensional conversion element by using first electromagnetic radiation;

means for irradiating said two-dimensional conversion element with second electromagnetic radiation to read the two-dimensional information from said two-dimensional conversion element and then write the thus-read information to said light-to-light conversion element; and means for displaying the information written by said irradiating means to said light-to-light conversion element.

6. A display unit according to claim 5, wherein said light-to-light conversion element is composed of at least a photoconductive layer facing said two-dimensional conversion element and a photo-modulation layer, and said two-dimensional conversion element comprises an additional light-to-light conversion element including a bismuth silicon oxide layer.

7. A display unit according to claim 6, wherein said photo-modulation layer is made of lithium niobate.

8. A display unit according to claim 6, wherein said light-to-light conversion element further includes a dielectric mirror laminated between said photoconductive layer and said photo-modulation layer, and a pair of transparent electrodes laminated on said photoconductive layer and said photo-modulation layer, respectively, said additional light-to-light conversion element further including an insulating layer laminated on one side of said bismuth silicon oxide layer facing away from said light-to-light conversion element, a dielectric mirror laminated on the opposite side of said bismuth silicon oxide layer, and a pair of transparent electrodes laminated on said insulating layer and said dielectric mirror, respectively, said irradiating means including a polarizer disposed between said light-to-light conversion element and said additional light-to-light conversion element.

9. A display unit according to claim 8, wherein said light-to-light conversion element, said polarizer and said additional light-to-light conversion element are laminated together.

10. A display unit according to claim 5, wherein said light-to-light conversion element is composed of at least a photoconductive layer facing said two-dimensional conversion element and a photo-modulation layer, and said two-dimensional conversion element comprises an additional light-to-light conversion element including at least a photoconductive layer and a photo-modulation layer facing said photoconductive layer of said light-to-light conversion element.

11. A display unit according to claim 10, wherein said photo-modulation layer is made of lithium niobate.

12. A display unit according to claim 10, wherein said light-to-light conversion element further includes a dielectric mirror laminated between said photoconductive layer and said photo-modulation layer, and a pair of transparent electrodes laminated on said photoconductive layer and said photo-modulation layer, respectively, said additional light-to-light conversion element further including a dielectric mirror laminated between said photoconductive layer and said photo-modulation layer, and a pair of transparent electrodes laminated on said photoconductive layer and said photo-modulation layer, respectively, said irradiating means including a beam splitter disposed between said light-to-light conversion element and said additional light-to-light conversion element.

13. A display unit according to claim 5, wherein said light-to-light conversion element is composed of at least a photoconductive layer facing said two-dimensional conversion element and a photo-modulation layer, and said two-dimensional conversion element comprises a light storage element.

14. A display unit according to claim 13, wherein said light storage element comprises a fluorescent substance.

15. A display unit according to claim 13, wherein said photo-modulation layer is made of a twisted-nematic liquid crystal.

* * * * *